United States Patent Office 2,915,353
Patented Dec. 1, 1959

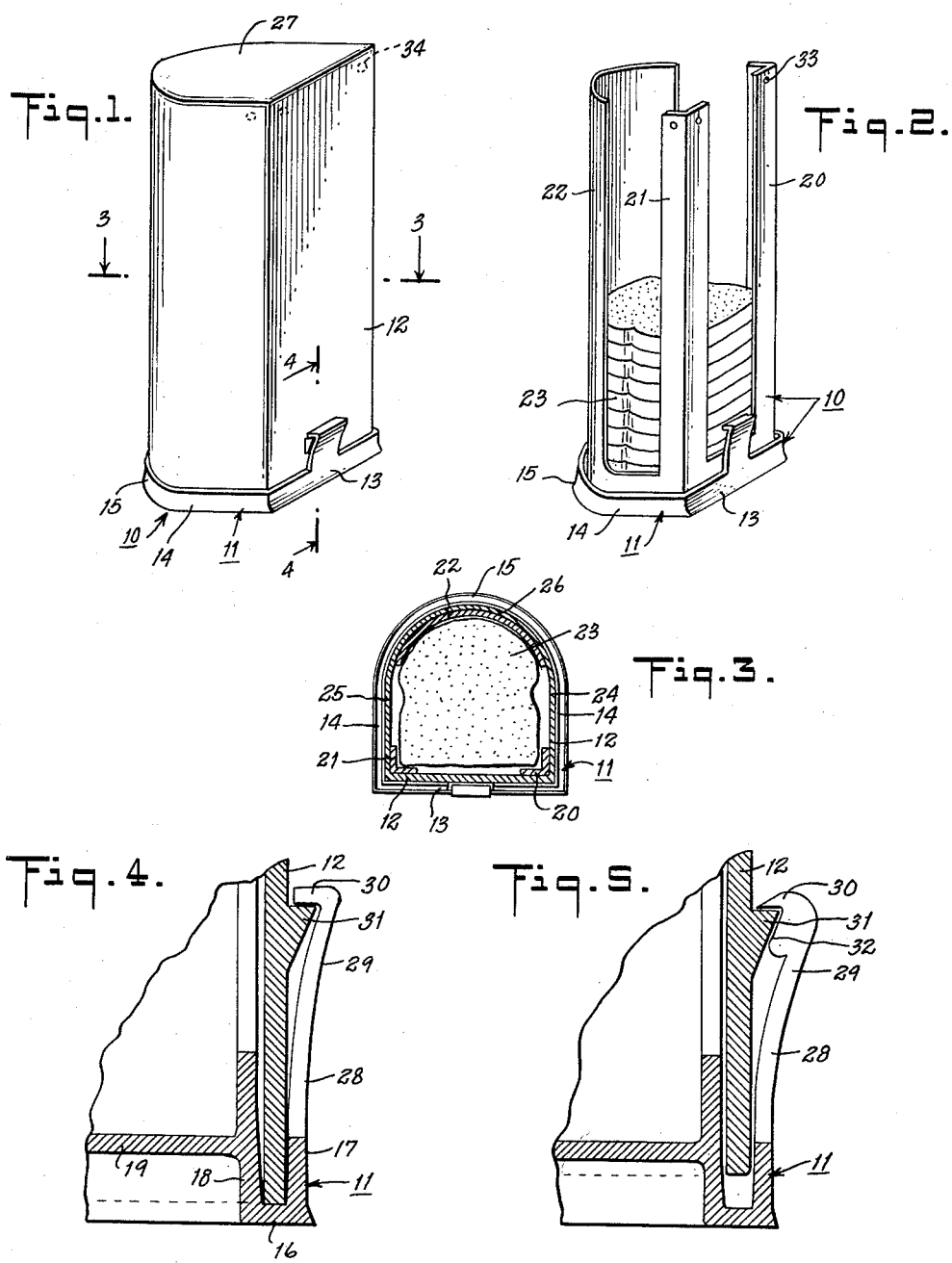

2,915,353

BREAD CONTAINER AND SERVER

Alwin C. Michaelsen, Rye, N.Y.

Application October 9, 1957, Serial No. 689,117

2 Claims. (Cl. 312—284)

This invention relates to a device for holding slices of bread and more particularly it relates to a device which contains slices of bread in an air sealed chamber.

It is well known that when bread comes in contact with the atmosphere it is subject to the loss of moisture, mold growth and staling. To remove slices of bread from a loaf that is packaged in the conventional paper wrapper it is necessary to break the wrapper seal and thereby destroying its protective function. Once this original seal is destroyed it is impossible to reform the wrapper adequately to prevent the loss of moisture and the entrance of mold spores around the slices of bread and as a result it is common to find several slices crusted or contaminated. Since this is undesirable, the housewife frequently discards these slices. The present invention is constructed to prevent the entrance of air around a loaf of bread and prevent the loss of slices caused by atmospheric dehydration while it is stored.

The primary object of this invention is, therefore, to provide a container for holding slices of bread to the exclusion of air and the prevention of mold formation.

Another object of this invention is to provide a container which permits the removal of individual slices of bread with ease and convenience.

A further object of this invention is to provide a container for bread which may be used directly at the dining table.

A still further object of this invention is to provide a container for bread which will protect the bread from outside forces and retain it in its original physical shape.

Other objects and features of this invention will become apparent from the following description and claims as well as in the drawings.

In the drawings:

Fig. 1 is a perspective view of the device embodying the present invention with the cover locked in position over the base;

Fig. 2 is a perspective view of the device embodying the present invention with the cover removed;

Fig. 3 is a horizontal cross-section taken along line 3—3 of Fig. 1;

Fig. 4 is a partial vertical cross-section showing a detailed arrangement of the locking means taken along line 4—4 of Fig. 1; and Fig. 5 is another embodiment of the locking means as shown in Fig. 4.

Referring to Figs. 1 and 2, the present invention is shown in detail. It is comprised of a housing for a loaf of bread denoted generally by the numeral 10, and a cover denoted by the numeral 12.

The housing 10 is provided with a base 11 which is shaped in the general contour of a slice of bread. In the embodiment shown in the drawings, the base 11 is D-shaped, one side of said base is flat 13, the ends of said flat side having forwardly extending horizontal arms 14 joined together at their ends by a semi-circular side 15. If the general contour of the slices of bread to be held within said housing 10 are other than D-shaped, suitable variations may be made to the contour of base 11 to accommodate said differently shaped slices.

The peripheral edge of base 11 comprises a downwardly extending U-shaped section having a bottom or resting section 16 and a pair of upwardly spaced extending arms 17 and 18. A horizontally disposed center section 19 is connected to arm 18 and joins the peripheral walls 13, 14 and 15.

Housing 10 and its component sections may be constructed in one piece, however, it is obvious that various sections may be constructed individually and joined to their adjacent parts.

The bread housing 10 is provided with upwardly extending arms to hold the slices in a fixed vertical position when they are stacked one upon the other. Fig. 2 shows an embodiment comprising three upwardly extending arms 20, 21 and 22. These vertical arms may be constructed as an extension of the inner vertical arm 18. In Fig. 2 the vertical arms 20 and 21 comprise a right angle section and are affixed in the two corners formed by wall sections 13 and 14. The upwardly extending vertical arm 22 extends from the semi-circular wall section 15 of base 11. It should be appreciated that these arms may be constructed by solid section as shown in the drawings or by shaped wire or the like. The vertical height of arms 20, 21 and 22 should be equal to or slightly longer than the conventional length of a loaf of bread.

In Fig. 3 slices of bread 35 are shown held in their proper position between the upwardly extending vertical arms. The square ends or base corners of the bread are aligned by the right angled arms 20 and 21 while the top or arced surface of the bread is guided by the semi-circular arm 22. As shown in Fig. 2, the vertical arms are sufficiently spaced from each other to leave a vacant area for convenient manual removal of the individual bread slices.

Cover 12 is constructed in the same shape as base 11. In the embodiment shown in the drawings the cover is D-shaped and is provided with a flat side 23, forwardly extending sides 24 and 25 from said flat side 23 and a semi-circular side 26 joining the ends of sides 24 and 25. The vertical height of the cover 12 is slightly longer than the vertical height of arms 20, 21 and 22 and is closed at its upper end 27. The bottom end of cover 12 is open and is constructed to fit within the downwardly extending U-shaped opening between the vertical base walls 17 and 18 and rests on the bottom wall 16 around the periphery of base 11. As shown in Fig. 4, the inside of walls 17 and 18 may have a slight inward taper decreasing the opening formed by this U-shaped section to create a frictional seal when the ends of cover walls 23, 24, 25 and 26 are inserted between the vertical walls 17 and 18 of base 11. The walls 17 and 18 may be constructed to slant inwardly thus providing the necessary taper to form the frictional seal.

It has been found desirable to provide the device with a locking mechanism to insure that the cover is positioned in its proper alignment and that the frictional seal is maintained. The locking mechanism shown in Figs. 1 and 4 comprises an upwardly extending section 28 from the flat wall 13 of base 11 having a backwardly sloping section 29 and a horizontally forwardly extending arm 30 affixed to the upper end of section 29. The flat side 23 of cover 12 may be provided with an outwardly extending angular welt 31 having a flat surface at its upper end and a downwardly and inwardly extending taper. Angular welt 31 cooperates with the forwardly extending arm 30. When the cover is inserted into the base, locking arm sections 28 and 29 may be bent backwardly to allow the passage of the welt 31 over the horizontally forwardly extending section 30 of locking arm 28 and 29. When the welt 31 has cleared horizontal arm 30, the locking section will spring back against cover wall 23 and over welt 31 to hold the cover in place. It should be noted that the welt 31 and arm 30 are located in such a position that they will cooperate with each other when the bottom section of the cover 12 has formed the frictional seal between vertical arms 17 and 18.

A second embodiment of the locking mechanism is shown in Fig. 5. In this embodiment the locking mechanism 28 is provided with a backwardly extending section 29 having a horizontally forwardly extending section 30 at its upper end. Between section 30 and section 29 is a forwardly extending angular cam 32 protruding inwardly from its upper end and cooperating with welt 31. As shown in Fig. 5, the base of cover 12 does not engage the bottom section 16. There remains room for additional downward vertical movement of the cover once it is in the locked position. When the cover in Fig. 5 is pressed downwardly the angular welt 31 presses against the angular cam surface 32 of locking mechanism 28 forcing it backwardly to provide a space for grasping the locking mechanism and withdrawing it beyond welt 31.

It has also been found advantageous to provide additional frictional locking means, such as outwardly protruding ball sections 33 at the ends of arms 20, 21 and 22 and cooperating socket sections 34 in cover 12 to prevent inadvertent separating of the cover from the housing when the device is lifted by the cover. The friction created between this ball and socket joint should be more than sufficient to withstand the downward force of a loaf of bread held within the housing. Another form of frictional locking means may comprise outwardly extending conical protrusions near the upwardly extending ends of arms 21 and 22 which would register with cooperating circular openings in the sides of cover 12 when said cover is fitted in the tapered U-shaped walls 17 and 18. Suitable handle means may be provided at the upper portion of the cover for carrying the container or removing the cover.

The present invention may be used as a container for sliced loaves of bread when they are packed by the producer for merchandising to the consumer or it may be used to store and serve bread after it has been removed from the conventional paper wrappers. A housewife who purchases a loaf of bread may remove it from its wrapper and insert the slices between the vertical arms and seal it from the atmosphere by inserting and locking the cover. When the bread is maintained within the container it is excluded from the atmosphere and will remain fresh at all times. To serve the bread, the locking mechanism is withdrawn, the cover removed and the slices conveniently slid upwardly between the holding arms. After the desired number of slices have been removed, the cover is replaced and locked and once again the container is sealed from atmospheric conditions.

The device may be constructed of cardboard, plastic or other suitable materials which are inexpensive and have some resiliency. It is obvious that the container may be made attractive and most suitable for table use.

It can be seen from the above description that the invention affords a new and novel container for bread and that the previously noted disadvantages have been overcome by the features of the present device. Although one embodiment of this invention has been shown and described herein, it is understood that certain changes and additions can be made without departing therefrom. By way of example rather than limitation, it can be observed that other locking mechanisms may be used, likewise various arm constructions could be substituted. These and other features may be included without departing from the spirit and scope of this invention.

I claim:

1. A vertical bread container comprising a horizontal base shaped in the contour of a slice of bread, said base having a downwardly extending U-shaped section integrally formed around its periphery, said U-shaped section having a downwardly and inwardly tapering interior and exterior wall, a base wall joining the lower extending ends of said tapered walls, a plurality of spaced upwardly extending arms about the periphery of said base, a vertical cover open at one end and closed at the other end removably fitted over said upwardly extending arms and between said vertical walls, the upwardly ends of said arms being provided with outwardly protruding ball sections, the closed end of said cover being provided with outwardly protruding socket sections cooperating with said ball sections when said cover cooperates with said vertical walls.

2. A vertical bread container comprising a horizontal base shaped in the contour of a slice of bread, said base having a downwardly extending U-shaped section integrally formed around its periphery, said U-shaped section having a downwardly and inwardly tapering interior and exterior wall, a base wall joining the lower extending ends of said tapered walls, a plurality of spaced upwardly extending arms about the periphery of said base, a vertical cover open at one end and closed at the other end removably fitted over said upwardly extending arms and between said vertical walls, the upwardly ends of said arms being provided with outwardly protruding ball sections, the closed end of said cover being provided with outwardly protruding socket sections cooperating with said ball sections when said cover cooperates with said vertical walls, said exterior wall provided with a vertical extending section having a horizontal inwardly extending arm at its upper end, a downwardly and inwardly extending cam below said horizontal arm, said cover being provided with a protruding welt angled downwardly and inwardly, said horizontal arm and cam cooperating with said welt when said cover cooperates with said vertical walls.

References Cited in the file of this patent

UNITED STATES PATENTS

| | | |
|---|---|---|
| 584,906 | Tribolet | June 22, 1897 |
| 1,602,020 | Wheeler | Oct. 5, 1926 |
| 1,622,494 | Cranston | Mar. 29, 1927 |
| 1,863,793 | Hermani | June 21, 1932 |
| 2,157,255 | Bumpass | May 9, 1939 |
| 2,172,013 | Parry | Sept. 5, 1939 |
| 2,263,632 | Kendall | Nov. 25, 1941 |